(12) United States Patent
Donaldson et al.

(10) Patent No.: US 8,467,653 B2
(45) Date of Patent: Jun. 18, 2013

(54) FIBER OPTIC CABLE RETAINER FOR A FIBER OPTIC CABLE CONNECTOR ASSEMBLY

(75) Inventors: Christopher Donaldson, Greenville, SC (US); Anthony Nieves, Fountain Inn, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 350 days.

(21) Appl. No.: 12/528,545

(22) PCT Filed: May 29, 2009

(86) PCT No.: PCT/US2009/045612
§ 371 (c)(1), (2), (4) Date: Aug. 25, 2009

(87) PCT Pub. No.: WO2009/146409
PCT Pub. Date: Dec. 3, 2009

(65) Prior Publication Data
US 2010/0329627 A1       Dec. 30, 2010

Related U.S. Application Data

(60) Provisional application No. 61/057,314, filed on May 30, 2008, provisional application No. 61/092,101, filed on Aug. 27, 2008.

(51) Int. Cl.
*G02B 6/00* (2006.01)
*G02B 6/36* (2006.01)

(52) U.S. Cl.
USPC ............ 385/136; 385/76; 385/81; 385/87; 385/137

(58) Field of Classification Search
USPC ............... 385/76–87, 134–137, 139
See application file for complete search history.

(56) References Cited

U.S. PATENT DOCUMENTS

| | | | |
|---|---|---|---|
| 5,313,540 A * | 5/1994 | Ueda et al. | 385/78 |
| 5,418,874 A | 5/1995 | Carlisle et al. | |
| 5,446,817 A | 8/1995 | Kardos et al. | |
| 5,638,477 A | 6/1997 | Patterson et al. | |
| 7,341,382 B2 * | 3/2008 | Dye | 385/78 |
| 7,568,844 B2 * | 8/2009 | Luther et al. | 385/60 |
| 7,637,673 B2 * | 12/2009 | Oike et al. | 385/98 |
| 2010/0034502 A1 * | 2/2010 | Lu et al. | 385/60 |

* cited by examiner

*Primary Examiner* — Daniel Petkovsek
(74) *Attorney, Agent, or Firm* — Sughrue Mion, PLLC

(57) ABSTRACT

The present invention relates to a cable retainer for attaching a connector to a fiber optic cable. The cable retainer includes at least a grooved anchor whereby a connector assembly formed of a connector and a cable can be aligned and secured through the anchor alone. The cable retainer may further comprise a crimp band that is slid over the anchor and connector assembly to secure aramid yarns, and to provide additional support to the connector assembly.

5 Claims, 8 Drawing Sheets

FIBER OPTIC CABLE RETAINER FOR A FIBER OPTIC CABLE CONNECTOR ASSEMBLY

This application claims the benefit of Provisional Application No. 61/057,314 filed May 30, 2008, and No. 61/092,101 filed Aug. 27, 2008. The disclosures of the prior provisional applications are hereby incorporated by reference in their entirety.

BACKGROUND OF THE INVENTION

1. Field of the Invention

Exemplary embodiments of the present invention relate to a cable retainer that serves as a coupling device between a connector and a fiber optic cable and a method for coupling a connector and fiber optic cable with a cable retainer. In particular, the exemplary embodiments relate to a cable retainer having a central grooved channel that creates a free floating ferrule design providing a more efficient assembly, greater optical alignment capability, and increased manufacturability.

2. Description of the Related Art

In the communication field, fiber optic cables have exemplified a viable technological advantage over the traditionally used copper wires. For example, when compared to the copper wires, fiber optic cables exhibit greater bandwidth, faster connection speeds, lower transmission loss (thus a longer transmission range), and no electro-magnetic interference or cross-talk. Thus, from a technological stand point, replacing copper wires with fiber optic cables would greatly improve the quality and performance of transmissions in the communication field.

From a commercial standpoint, however, fiber optic cables have not yet proven to be a complete alternative to copper wires. For example, to reach full commercial potential in the communication field, a product must be relatively easy to use on the go or in the field, and must be hardened to avoid degrading the signal quality. Contrastingly, the process of terminating a fiber optic cable with a connector in such a manner has traditionally been a tedious and complex job requiring special equipment and training, and has thus prevented the full commercial potential of fiber optic cables from being realized.

In an attempt to increase commercial potential, a series of fiber optic connector kits have been produced to ruggedize fiber optic cables for field applications. Generally, these kits pre-terminate the cable with a connector thus relieving the need to do so in the field.

Figure 1:
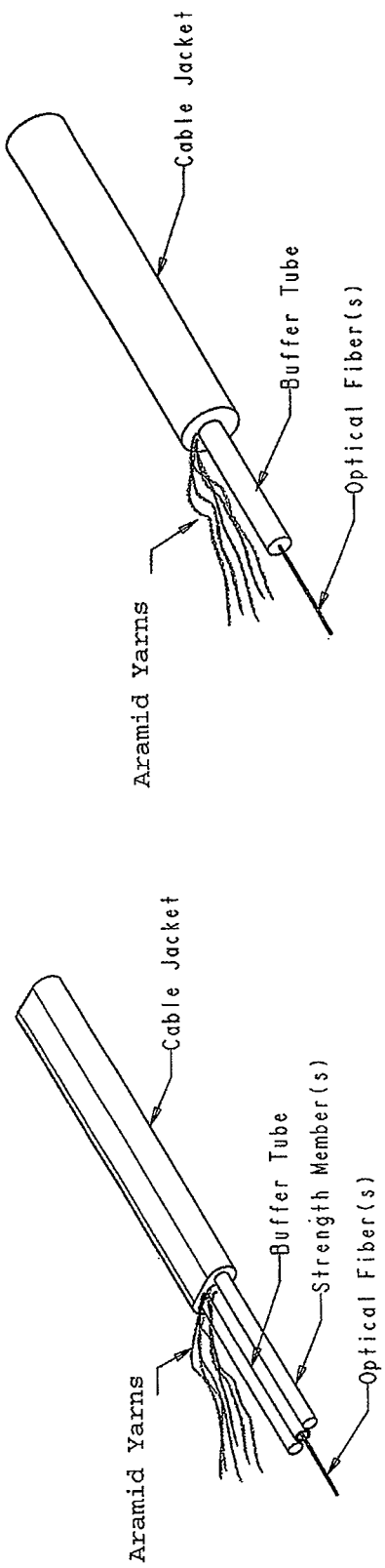

A typical fiber optic cable contains an optical fiber, a buffer which surrounds the optical fiber, strength members, aramid yarns, and a cable jacket as shown in FIG. 1. When the fiber optic cable is terminated with a connector, the cable is prepared to expose the fiber, buffer tube, strengthening members and aramid yarns. A portion of the buffer tube is stripped back to expose the fiber, and the fiber end is then polished and fixed to the connector forming a connector subassembly. Once the connector subassembly is formed, the subassembly is inserted into a coupling device to further support the connection.

Figure 3:
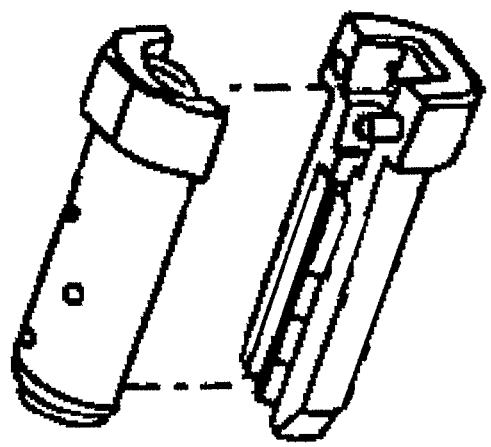

One example of a coupling device is illustrated as a crimp housing in U.S. Pat. No. 7,090,407. As shown in FIG. 3, the crimp housing is comprised of two half-shells that are pinned together to secure a connector subassembly. When attaching the coupling device to the connector subassembly, epoxy is inserted into strengthening member conduits of a first half shell. The optical subassembly is then placed into the first half shell whereby the strengthening members are inserted into the strengthening member conduits of the first half shell and the buffer tube is inserted into a separate central conduit. Epoxy is then injected into the strengthening member conduits of the second half shell. The second half shell is then placed on top of the first half shell and pinned, thereby capturing the connector, buffer tube, and strengthening members. As a last step, a crimp band is slid over the two half shells capturing the aramid yarns and the terminated cable end is cured for 45 minutes at 130° C.

Although the two half shell design has served as an initial design, such a design introduces assembly and alignment difficulties. For example, the fact that there are two half shells doubles the number of parts which inherently increases the manufacturing difficulties with respect to yield and cost. Furthermore, the need to pin the half shells together during assembly introduces the need for complimentary pin and hole locations between the half shells, thus reducing the tolerance for error when manufacturing the shells.

Additionally, when connecting the fiber optic cable and connector, it is important that the connector and cable are properly aligned to ensure that the connection does not degrade the quality of the communication. However, when inserting the fiber into the two half-shell design, the position of the subassembly is not secured until the two half shells are pinned together, thus allowing for the possibility of movement. Furthermore, once the shells are pinned together, the shells rigidly hold the fiber reducing the capability to adjust the optical alignment between the connector and cable.

Figure 2:
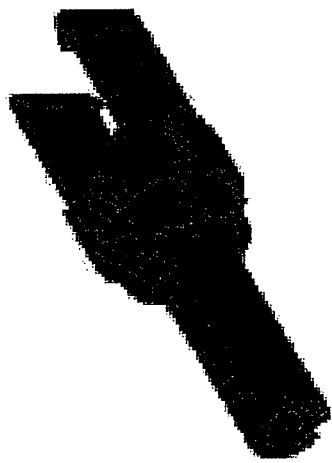

A second example of a coupling device is illustrated in FIG. 2. The coupling device is formed with a central tunnel extending the length of the device and two arms extending from one end of the tunnel portion. With this design, a fiber optic cable is first fed through the tunnel and past the two arms. The fiber is then subsequently prepared for connection and, in turn, a connector is adhered to the fiber forming a subassembly, as described above. The subassembly is then pushed backwards into the tunnel until the connector passes the outer ledges of the arm. Once pushed back, the subassembly is essentially snapped into position with the ledges preventing the subassembly from moving forward out from the tunnel, and the tunneled portion blocking the cable from moving backwards into the tunnel.

This second example, however, also poses additional alignment and assembly issues. For example, the feed through tunnel requires the fiber optic cable to be first fed through the tunnel before attaching the connector, thereby introducing assembly difficulties. Additionally, the feed through tunnel rigidly attaches the cable making it hard to properly align the connector and cable.

SUMMARY OF THE INVENTION

Exemplary embodiments of the present invention provide a cable retainer having a central grooved channel that serves as a coupling device between a connector and a fiber optic cable. The cable retainer provides a free floating ferrule design that allows for a more efficient assembly, greater optical alignment capability, and increased manufacturability.

Specifically, the exemplary embodiments relate to a cable retainer for attaching a connector to a cable wherein the cable retainer contains a one piece anchor having a connector portion, a cable portion, and a grooved channel disposed on a surface of the anchor.

The cable retainer may also contain a crimp band that fits over the cable portion.

The grooved channel substantially spans the entire length of the anchor.

The connector portion may further include an anti-rotation feature on a surface of the anchor, perpendicular to the length of the grooved channel. The anti-rotation feature may be a cut-out on the surface of the anchor, the cut-out being formed with at least a pair of edges that are either parallel or perpendicular to one another.

The connector portion may include a shoulder perpendicular to the length of the grooved channel, the shoulder encompassing an area proximately surrounding the grooved channel.

The connector portion may also include at least two snaps on an edge of the connector portion along the length of the grooved channel of which the cable is inserted, the snaps being in the form of a ledge that hangs over the edge.

The cable portion may include at least one strengthening member channel positioned away from the grooved channel, the strengthening member channel substantially spanning the entire length of the cable portion. The strengthening member channel may include at least one pocket.

The anchor may also include an angled portion that separates at least one strengthening member of the cable from an optical fiber portion of the same cable.

The cable portion may also contain at least one ridge.

The cable retainer may also contain a clip and clip slot, wherein the clip slot may be disposed along a cross section of the connector portion taken in a plane perpendicular to the length of the grooved channel. The clip is of a shape that may be inserted into the clip slot, wherein the clip may have at least one lock tab and at least one stop band on an outermost surface of the clip of which would be last inserted into the clip slot.

The cable retainer may also be contained in a hardened fiber optic connector assembly that may further includes a strain relief boot, a coupling nut, an outer connector housing, a connector, and a connector body.

The exemplary embodiments of the present invention also relate to a method for attaching a connector to a cable with a cable retainer including a one piece anchor a connector portion, a cable portion, and a grooved channel disposed on a surface of the anchor, the method including inserting the cable into the grooved channel of the anchor to secure the cable, and inserting the connector into the connector portion of the anchor to secure the connector.

The method may include the cable being inserted into the connector portion of the anchor by feeding the cable into the connector after the connector is inserted into the connector portion of the anchor.

The method may include the cable being terminated with the connector before inserting the cable into the grooved channel and the connector into the connector portion of the anchor.

The method may include a crimp band being slid over the cable portion of the anchor once the cable is inserted into the anchor.

The method may include a connector being inserted into an anti-rotation feature on a surface of the anchor, perpendicular to the length of the grooved channel, to prevent the connector from rotating within the anchor.

The method may include a connector being pressed onto a shoulder to prevent the connector from moving, the shoulder being perpendicular to the length of the grooved channel and comprising an area proximately surrounding the grooved channel.

The method may include a connector being pressed into at least two snaps to further secure the terminated cable within the anchor, the at least two snaps being on an edge of the connector portion along the length of the grooved channel of which the cable is inserted.

The method may include at least one strengthening member of the cable being exposed and inserted into at least one strengthening member channel, the strengthening channel being positioned away from the grooved channel and substantially spanning the entire length of the cable portion.

The method may include an adhesive being applied to at least one pocket of the strengthening member channel to secure the at least one strengthening member.

The method may include at least one strengthening member of the cable is exposed during the terminating process and is separated from an optical fiber of the cable by an angled portion as the terminated cable is inserted into the grooved channel.

The method may include aramid yarns are exposed and secured by ridges on the cable portion after cable is inserted into the anchor.

The method may include a clip being inserted into a clip slot disposed along a cross section of the connector portion taken in a plane perpendicular to the length of the grooved channel to further the connector and cable after it they are inserted into the anchor.

Exemplary embodiments of the present invention address at least the above problems and/or disadvantages as well as other disadvantages of which have not been mentioned. Additionally, the present invention is not required to overcome the disadvantages described above, and the exemplary embodiments of the present invention may not totally overcome any of the problems described above.

BRIEF DESCRIPTIONS OF THE DRAWINGS

Many aspects of the invention can be better understood with reference to the following drawings. The components in the drawings are not necessarily to scale. Instead, emphasis is placed on clearly illustrating the principles of the present invention.

FIG. 1: (Related Art) A description of a typical fiber optic cable.

FIG. 2: (Related Art) A coupling device with a feed through tunnel.

FIG. 3: (Related Art) A coupling device consisting of two half shells.

Figure 4:
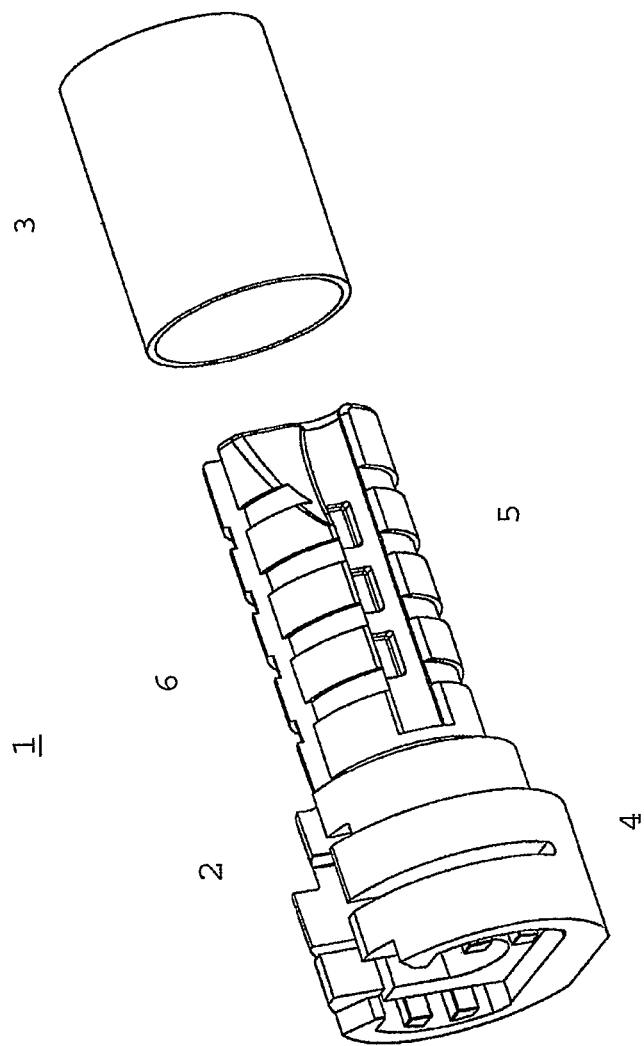

FIG. 4: An exploded view of an embodiment of a cable retainer comprising a grooved anchor and a crimp band.

Figure 5:
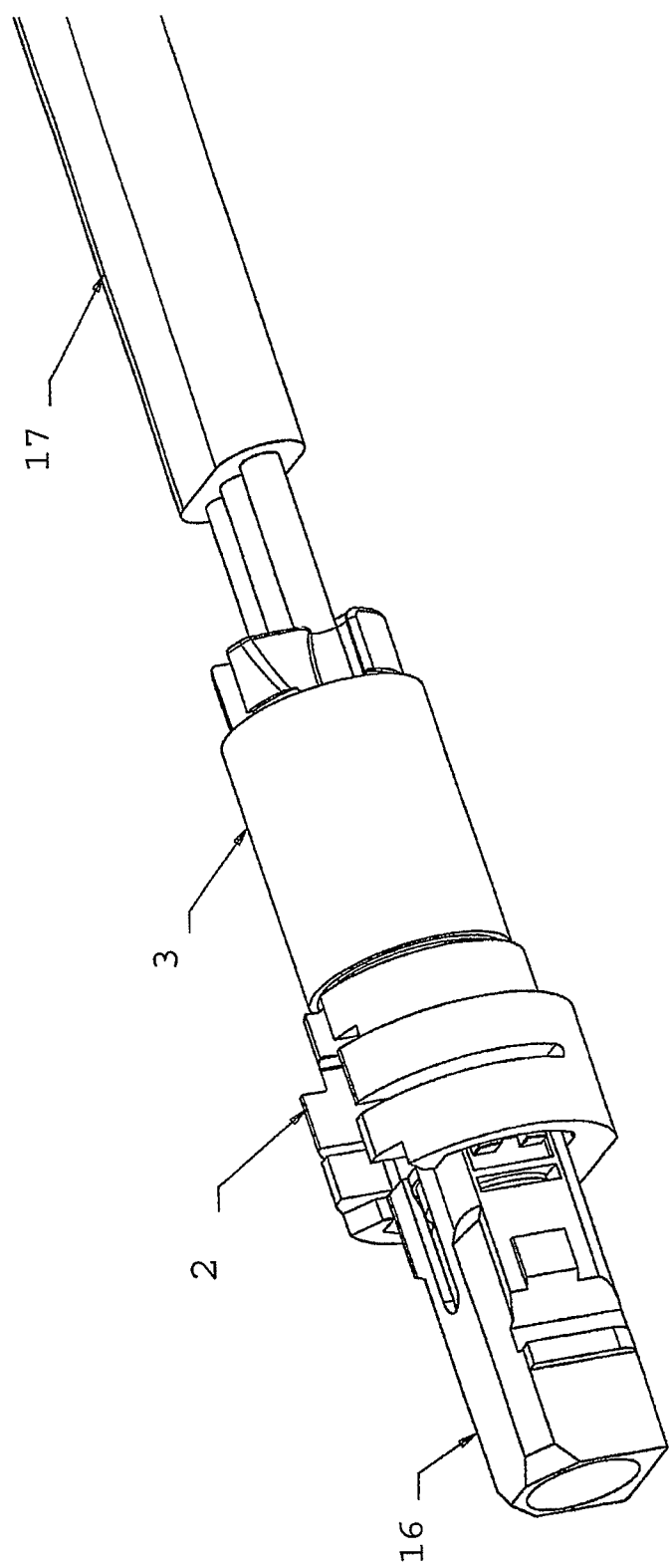

FIG. 5: An embodiment of a cable retainer supporting an optical subassembly containing a connector and a fiber optic cable.

Figure 6:
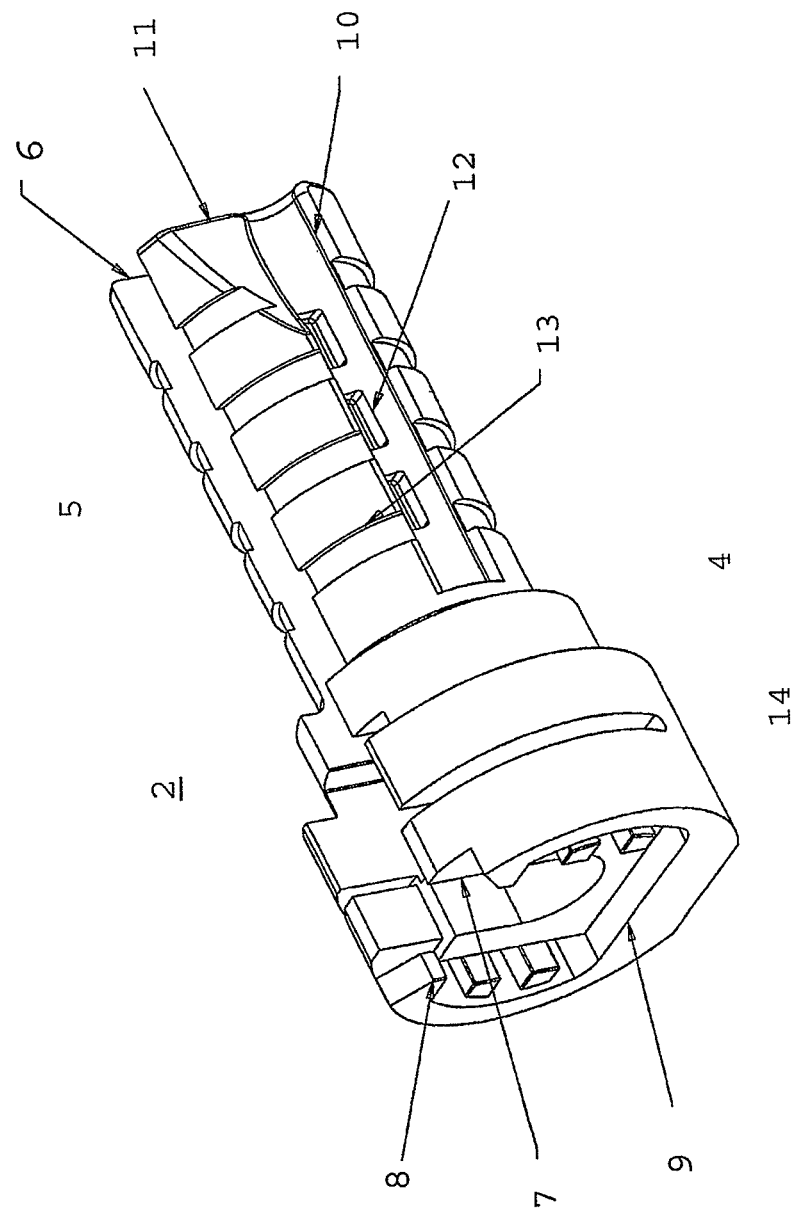

FIG. 6: An embodiment of a cable retainer illustrating additional features of the connector portion and the cable portion.

Figure 7:
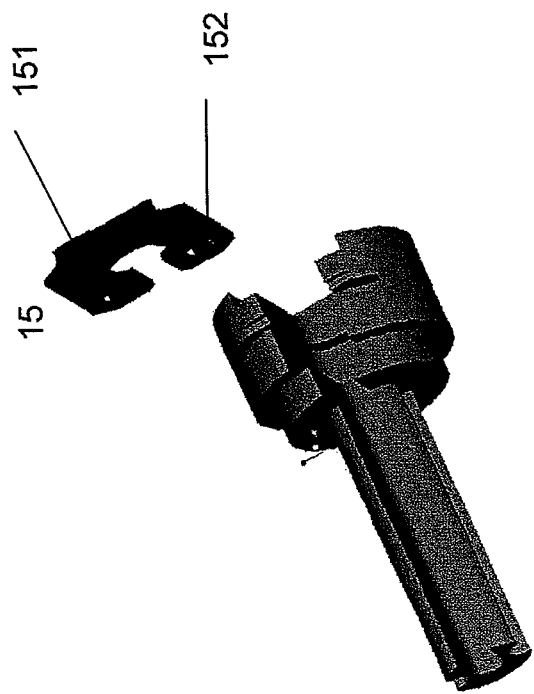

FIG. 7: An embodiment of a clip.

Figure 8:
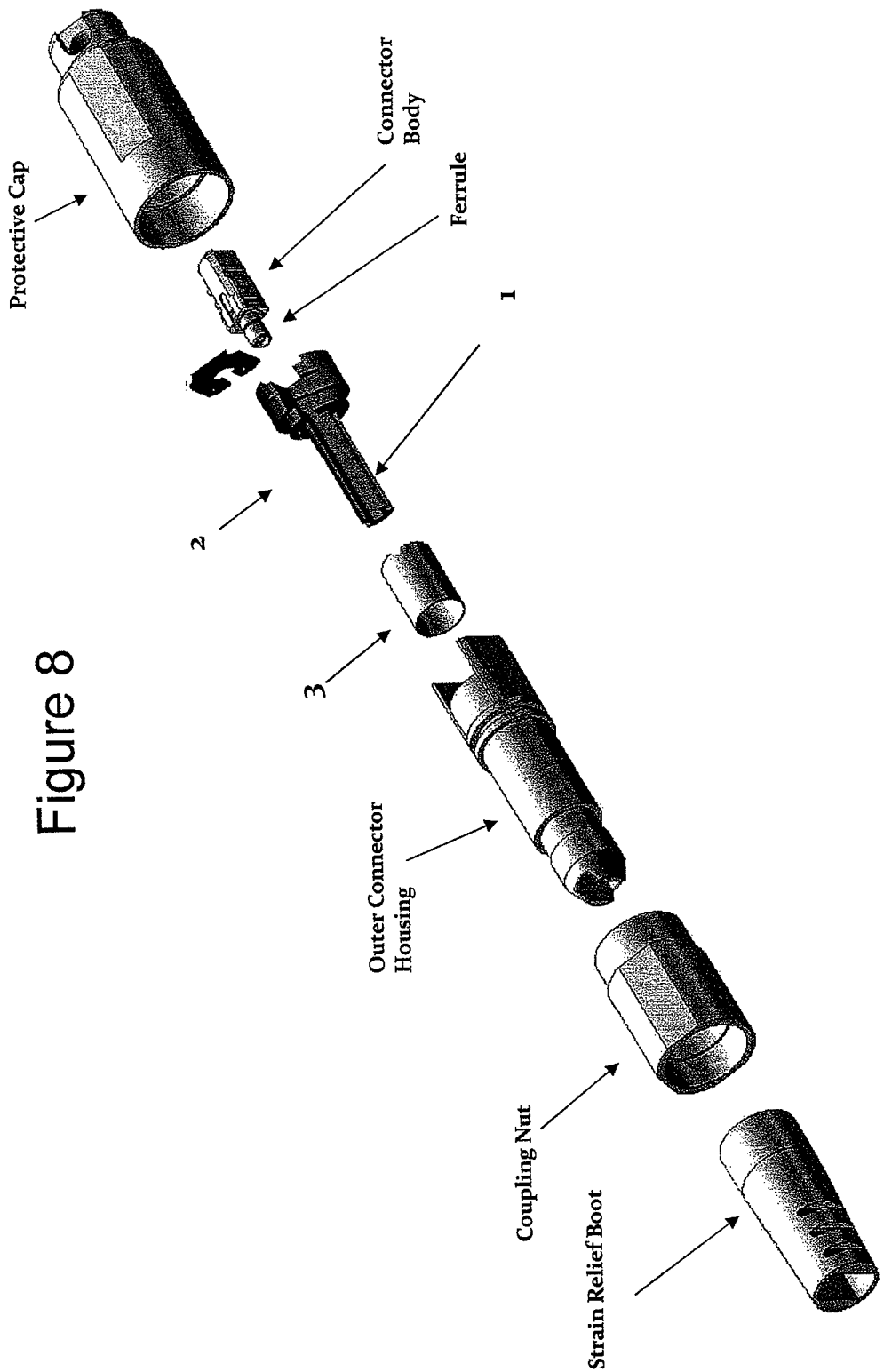

FIG. 8: An embodiment of a hardened fiber optic connector subassembly comprising a cable retainer.

DETAILED DESCRIPTION OF THE INVENTION

Hereinafter, the present invention is described more fully by way of exemplary embodiments with reference to the accompanying drawings. The embodiments are intended to assist in the understanding of the invention, and are not intended to limit the scope in any way. In the following description, like reference numerals denote like elements having similar functions, and duplicate explanations of these elements are omitted.

An objective of the exemplary embodiments of the present invention is to provide a cable retainer that supports and terminates a fiber optic cable without sacrificing performance and manufacturability, and without complicating the assembly process. However, it is not necessary that this objective be met.

FIG. 4 is a view of a cable retainer 1 according to an exemplary embodiment of the present invention. The cable retainer 1 includes a one piece anchor 2 and may also include a crimp band 3. The anchor 2 has a cylindrical shape comprising a connector portion 4 and a cable portion 5. The connector portion 4 is capable of housing various connectors including connectors that meet Telcordia GR-3120 and GR-326 specifications. However, it is not necessary that the Telcordia standards be met. A central grooved channel 6 is disposed on a surface of the anchor 2, substantially spanning the entire length of the anchor 2 through the connector portion 4 and cable portion 5. The central grooved channel can be embodied as a U-shaped channel or V-shaped channel, but is not limited to these shapes.

A connector subassembly is formed by adhering a connector to a fiber optic cable whereby the connector assembly is inserted into the cable retainer 1 to provide additional support and alignment capabilities to the subassembly as shown in FIG. 5. The connector and the cable are slid into respective portions of the central grooved channel 6, and a crimp band 3 is slid over the cable portion 5 to capture the aramid yarns of the fiber optic cable. The crimp band 3 has a diameter that is slightly larger than the cable potion 5, and is stopped by the larger diameter of the connector portion 4.

The above embodiment of the cable retainer 1 is not limited to the aspects described above, and may encompass additional features. FIG. 6 illustrates an embodiment of the cable retainer 1 further comprising at least one of a shoulder 7, snaps 8, and an anti-rotation feature 9 within the connector potion 4. The shoulder 7 is a surface parallel to the end of the connector portion 4 that resides within a cut out on the end connector portion 4 opposite of the cable potion 5. The shoulder 7 braces the connector housing that surrounds the ferrule and prevents the connector from moving beyond the shoulder 7 and into the cable portion 5.

The connector portion 4 may also comprise an anti-rotation feature 9 that prevents the connector from rotating within the anchor. Although not limited to any specific structure, an anti-rotation feature 9 may be embodied as the edges of the cut-out on the end of the connector portion 4 for exemplary purposes. The edges are flat surfaces perpendicular to the shoulder 7 and protrude out from the shoulder 7 preventing the connector from rotating in a plane perpendicular to the length of the grooved channel 6. In FIG. 6, the anti-rotation feature 9 is embodied as three connected sides wherein the first and second side are parallel to one another and the third side is perpendicular to both the first and second side. However, when embodied as sides, the anti-rotation feature 9 may consist of at least two edges that are either parallel or perpendicular to one another.

The connector portion 4 may also comprise snaps 8 to secure the connector within the grooved channel 6 of the connector portion 4. The snaps 8 are disposed on the connector portion 4 at the end of the grooved channel 6 and slightly project over the portion of the grooved channel 6 of which the cable is initially inserted. Upon insertion, snaps 8 are temporarily bent to allow the connector with the cable to pass into the grooved channel 6 and then return to their original positions to secure the connector within the channel 6.

FIG. 6 illustrates an embodiment of the cable retainer 1 comprising additional features within the cable portion 5. The cable portion 5 may further comprise at least one of the following elements: at least one strengthening member channel 10, an angled portion 11, anchor pockets 12, and ridges 13. The at least one strengthening member channel 10 is located on the surface of the cable portion 5 away from the central grooved channel 6, and spans almost the entire length of the cable portion 5. The strengthening member channel 10 secures the at least one strengthening member of the fiber optic cable.

The cable portion may further comprise an angled portion 11 to facilitate the spreading of the strengthening members of the fiber optic cable as the fiber optic cable is placed onto the anchor 2. The at least one angled portion 11 is located on the curved surface of the cable portion 5 between the central grooved channel 6 and the strengthening member channel 10.

Once the at least one strengthening member is in place, an adhesive may be used to secure the strengthening member. In such a case, the cable portion 5 further comprises anchor pockets 12 disposed within the at least one strengthening member channel 10. The adhesive is applied between the anchor pockets 12 and the at least one strengthening member.

The cable portion 5 may also contain ridges 13, on the outer surface of the anchor 2 to secure aramid yarns.

An embodiment of the retainer 1 may further comprise a clip slot 14 and a clip 15 as shown in FIG. 6 and FIG. 7. The clip slot 14 is a cross sectional slot with respect to the length of the grooved channel 6. The slot 14 extends a substantial distance through the connector portion 4, but does not extend all the way through. The clip 15 is of a shape that fits into the clip slot 14 and further comprises a stop tab 151 that limits the depth the clip 15 penetrates into the slot 14, and at least one lock tab 152 that prevents the clip 15 from moving out of the slot 14. It should be noted that at this point the fiber optic cable can be secured in place with only the snaps 8. The additional use of a clip 15 and crimp band 3 merely provide additional support to the assembly.

Furthermore, the cable retainer 1 may be embodied within a hardened fiber optic connector assembly as shown in FIG. 8. The hardened fiber optic connector assembly may comprise a strain relief boot, coupling nut, outer connector housing, crimp band, a clip, connector and connector body, and a protective cap in addition to the cable retainer 1.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed:

1. A cable retainer for attaching a connector to a fiber optic cable comprising:
    a one piece anchor, wherein the anchor comprises a connector portion, a cable portion, and a grooved channel having an open end and a closed end opposite from the open end extending along the length of the one piece anchor disposed on a surface of the anchor, wherein the cable portion comprises at least one strengthening member channel extending along a length of the one piece anchor positioned away from the grooved channel which secures at least one strengthening member of the fiber optic cable, wherein the cable portion further comprises at least one contain ridge on an outer surface of the anchor, said contain ridge secures aramid yarns.

2. The cable retainer of claim 1, wherein the grooved channel secures only a buffered tube of the fiber optic cable comprising optical fibers.

3. The cable retainer of claim 1, wherein the anchor comprises a front end and a rear end opposite to the front end along the length of the one piece anchor, the front end connecting to the connector,
   wherein the cable portion further comprises an angled portion disposed at the rear end of the anchor which separates the at least one strengthening member from buffered tube of the fiber optic cable.

4. The cable retainer of claim 3 further comprising a crimp band that fits over the at least one contain ridge of the cable portion which secures the aramid yarns with the at least one contain ridge.

5. The cable retainer of claim 3, wherein the angled portion is disposed between the grooved channel and the strengthening member channel along the surface of the anchor.

* * * * *